United States Patent [19]

Pamer et al.

[11] Patent Number: 4,498,825
[45] Date of Patent: Feb. 12, 1985

[54] LOAD INDICATING FLANGE

[75] Inventors: Walter R. Pamer; James A. Zils, both of Parma; Terry D. Capuano, Hinckley, all of Ohio

[73] Assignee: Russell, Burdsall & Ward Corporation, Cleveland, Ohio

[21] Appl. No.: 423,861

[22] Filed: Sep. 27, 1982

[51] Int. Cl.³ .................. F16B 39/28; F16B 31/02
[52] U.S. Cl. .......................... 411/11; 411/14; 411/186; 411/188; 411/544; 73/761
[58] Field of Search .................. 411/8–14, 411/154–156, 160–165, 186–189, 533, 544, 545; 405/259; 73/761

[56] References Cited

U.S. PATENT DOCUMENTS

| 1,923,647 | 8/1933 | Vera | 411/188 |
| 4,269,248 | 5/1981 | MacLean et al. | 411/186 |
| 4,281,699 | 8/1981 | Grube | 411/176 |
| 4,293,256 | 10/1981 | Pamer | 411/11 |
| 4,294,300 | 10/1981 | Bouwman | 411/188 |

FOREIGN PATENT DOCUMENTS

| 0028746 | 5/1981 | European Pat. Off. | 411/186 |
| 870946 | 6/1961 | United Kingdom | 411/10 |

Primary Examiner—Thomas J. Holko
Assistant Examiner—Neill Wilson
Attorney, Agent, or Firm—Pearne, Gordon, Sessions, McCoy, Granger & Tilberry

[57] ABSTRACT

A load indicating flange is provided either separately or on a nut or a bolt head. This load indicating flange has an axially directed face which has a wavy surface on which a plurality of crests are disposed for initial engagement with a work surface. A plurality of troughs are provided on the wavy surface one each between two of the crests. A gauge groove is provided at each trough and when the bolt and nut combination is properly tightened on a workpiece, the troughs are flattened toward the work surface to such an extent that a relatively thick gauge cannot enter the gauge groove. If the bolt and nut are improperly tightened, then the gauge will enter the gauge groove. A narrow band peripheral bearing surface is provided on the outer periphery of the face to prevent defacing the work surface. The foregoing abstract is merely a resume of one general application, is not a complete discussion of all principles of operation or applications, and is not to be construed as a limitation on the scope of the claimed subject matter.

21 Claims, 6 Drawing Figures

LOAD INDICATING FLANGE

BACKGROUND OF THE INVENTION

Bolts or nuts have previously been provided with an extending flange which has a wavy bearing surface, including crests and troughs, the crests engaging a workpiece upon initial installation, and then upon tightening of the threaded fastener the troughs of the wavy surface are pulled into engagement with the working surface of the workpiece. When this occurs, it indicates that the threaded fastener has been stressed to a predetermined proper amount. Such a load indicating fastener is shown in U.S. Pat. No. 4,293,256. This may be utilized to establish a predetermined preload on the fastener, the fastener being subject to cyclic or vibrational forces which might otherwise tend to loosen the threaded fastener unless it was properly stressed. The subjecting of the threaded fastener to a varying load can cause fatigue failure; hence, the endurance, strength and fatigue life of the fastener are considerably improved by applying a precise preload to the fastener.

Torque wrenches or other torque measuring devices have been previously used to attempt to determine the preload on the fastener. Such methods are inaccurate because many factors affect the resistance encountered by a torque wrench, including type and degree of heat treatment, the type and surface finish of the threads on both threaded fasteners, and the coefficient of friction between the two threaded fasteners as well as between the fastener and the working surface of the workpiece.

It has also previously been known to utilize a washer with a threaded fastener as an indication of the tightness of such threaded fastener. A known load indicating washer was one which had on a first face thereof a series of dimples pressed therein so that on the opposite face a series of complementary projections were provided. These projections were about midway of the radial extent of the washer and when the washer and threaded fastener combination was properly tightened against the working surface, the projections in the washer flattened out completely so that even a thin gauge could not be inserted at any place around the periphery of the washer between the washer and the working surface, thus determining the tightness of the threaded fastener.

U.S. Pat. No. 4,281,699 illustrated another form of a load indicating flange on a threaded fastener wherein the flange was initially planar except for biting teeth and, when tightened, was then deflected into a wavy surface by buttresses which strengthened the flange intermediate the locking teeth.

With the wave type load indicating flanges of all of these prior art units, regardless of whether the flange was unitary with the threaded fastener or merely was a washer intended to be used with a threaded fastener, it was very difficult to be certain when the threaded fastener was tightened a proper amount. Where the wavy surface of the flange was supposed to be tightened flat against the working surface of the workpiece, the visibility might be poor for the inspector, so that the crests could not readily be distinguished from the troughs in order to determine where to attempt to insert the thin metal gauge. Further, since the troughs were supposed to be tightened flat to within 0.001 inch of the workpiece, the inspector was attempting to utilize a gauge having a thickness of only 0.001 inch in thickness, and such metal gauge was far too thin to have structural rigidity and therefore was easily damaged.

SUMMARY OF THE INVENTION

The problem to be solved, therefore, is how to provide a load indicating flange for a threaded fastener wherein the amount of stress or load on the threaded fastener may readily be determined.

This problem is solved by a load indicating annular flange for cooperation with a first threaded fastener interengageable with a second threaded fastener, said flange having a first axially directed face relative to the axis of the first threaded fastener, said first face having crest means adapted to engage and transmit an axial load force to a cooperable surface upon the fasteners being tightened onto a workpiece, the flange having at least one trough portion in said first face and having portions resiliently deformable to have the trough portion movable toward the cooperable surface upon tightening of the two threaded fasteners onto a workpiece, characterized in that at least one gauge opening defined by a gauging surface is provided in said flange near said trough portion, said gauge opening having a predetermined thickness dimension parallel to said axis in the order of 0.005 to 0.030 inch to preclude entrance thereinto of a gauge of a predetermined thickness when the threaded fasteners have been properly tightened on the workpiece and to permit entrance of the gauge when the threaded fasteners have been insufficiently tightened on the workpiece.

This problem is further solved by a load indicating annular flange for cooperation with a first threaded fastener interengageable with a second threaded fastener, said flange having a first axially directed face relative to the axis of the first threaded fastener, said first face having crest means adapted to engage and transmit an axial load force to a cooperable surface upon the fasteners being tightened onto a workpiece, the flange having at least one trough portion in said first face and having portions resiliently deformable to have the trough portion movable toward the cooperable surface upon tightening of the two threaded fasteners onto a workpiece, characterized in that a narrow band peripheral bearing surface is provided on the radially outer portion of said flange first face, said peripheral bearing surface including said crest means and being a surface in all peripheral parts thereof substantially perpendicular to said axis along each radii to said axis.

Accordingly, an object of the invention is to provide a gauge opening in a flange surface of a load indicating flange to enable a person to determine the proper place to attempt to insert a gauge.

Another object of the invention is to provide a peripheral bearing surface on a load indicating flange which results in a minimum scarring of the surface of the workpiece.

A further object of the invention is to provide a gauge opening in a load indicating flange to accept a relatively thick gauge.

Other objects and a fuller understanding of the invention may be had by referring to the following description and claims, taken in conjunction with the accompanying drawing.

DESCRIPTION OF THE PREFERRED EMBODIMENT

Figure 1:
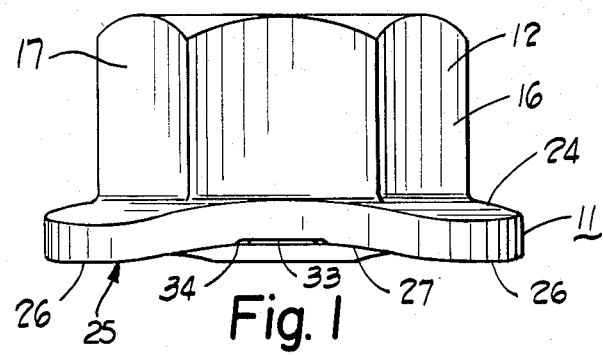
FIG. 1 is a side elevational view of a nut embodying the invention.
Figure 2:
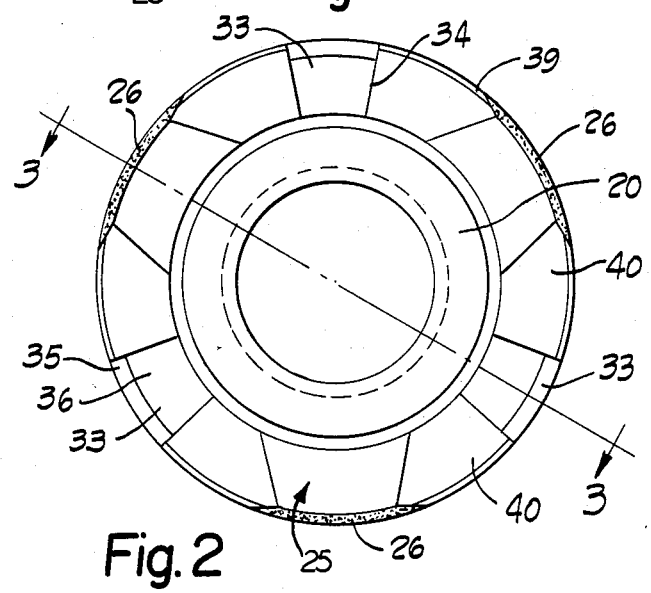
FIG. 2 is a bottom plan view of the nut of FIG. 1.
Figure 3:
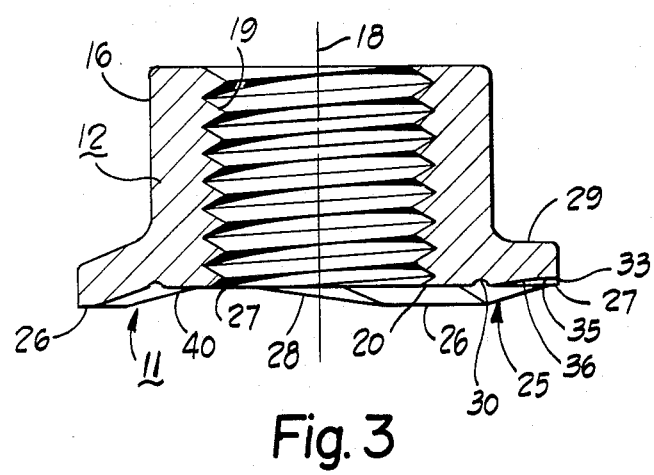
FIG. 3 is a longitudinal sectional view of the nut of FIG. 1.
Figure 4:
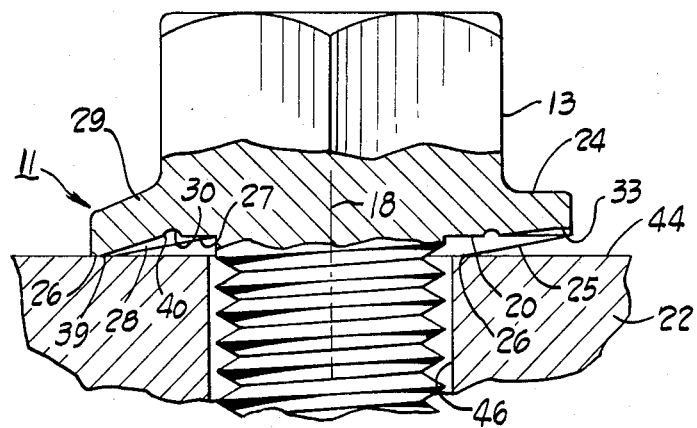
FIG. 4 is a partial longitudinal, sectional view of a bolt embodying the invention.
Figure 5:
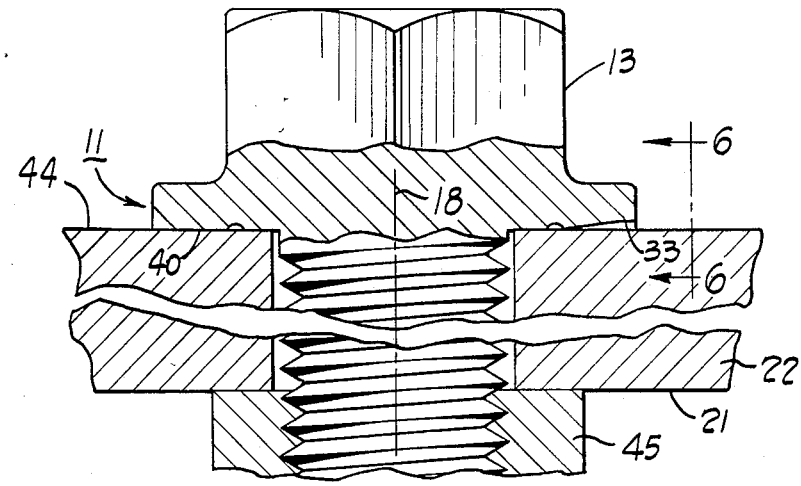
FIG. 5 is a longitudinal sectional view similar to FIG. 4 but with the bolt tightened on a workpiece.

FIGS. 1, 2, and 3 illustrate a load indicating flange 11 which is adapted for cooperation with a threaded fastener 12. This threaded fastener may be a nut 12 as shown in FIGS. 1-3, or may be a bolt 13 as shown in FIGS. 4 and 5. Although this invention is illustrated as applied to threaded fasteners, it may also be applied to non-threaded fasteners, for example, to Huck bolts. Further, although the load indicating flange is an annular flange, and may be a completely separate member for cooperation with the nut or bolt it is shown as being unitary with the nut 12 or bolt 13. The nut 12 has a body 16 which includes wrench pads 17, shown here as six in number, for a hexagonal surface to accept a tool for tightening or loosening the nut 12. This is an example of a surface which in cross section is a polygon to accept the tool. For example, a hexagonal socket head in a cap screw would be another form of a wrench pad. The nut has an axis 18 and a hollow interior with a female thread 19 of a suitable form. The nut body has a flat, annular bottom surface 20 coaxial with the axis 18, which bottom surface is adapted to cooperate with a work surface 21 of a workpiece 22 (see FIG. 5).

The flange 11 has a first or lower face 25 which is an axially directed face relative to the axis 18. The flange further has a second opposite face 24. This first face 25 has a plurality of crests 26 and a plurality of troughs 27 therebetween. There may be two or more such crests 26, and preferably three crests and three troughs are provided on the first face 25, establishing a wavy surface 28. The three crests provide a three-point contact relative to a cooperable surface when the threaded fastener is initially placed on a work surface of a workpiece. These three crests are adapted to engage and to transmit an axial load force to such cooperable surface, such as the work surface 21 of FIG. 5. The flange 11 has a plurality of resiliently deformable portions, and in FIGS. 1-3 this takes the form of a spring section 29, which lies generally radially outboard of the body 16 and also radially outboard of an annular groove 30 which lies generally at the periphery of the body 16. This annular groove helps to define the precise radial length of the spring section 29 and to more precisely define the load force required to axially deform such spring sections 29. As the nut 12 is tightened onto a cooperable threaded fastener, the crests 26 engage the cooperable surface, such as the work surface 21, and resiliently deform the spring sections 29 so that the troughs 27 are moved toward the cooperable surface.

A gauge surface is provided in the nut 12, and more specifically it is in the flange 11. This gauge surface takes the form of gauge grooves 33 extending axially into the wavy surface 28 by a predetermined thickness dimension in the order of 0.005 to 0.030 inch. Each gauge groove is bounded by rounded shoulders 34, which shoulders extend to the trough portions 27. These shoulders are at at least a 45-degree angle relative to the waxy surface 28, and preferably are close to a right angle. As shown in FIG. 2, the grooves are bounded by the shoulders 34, which may be parallel to each other but are shown in FIG. 2 as being radial lines. Such shoulders extend from the outer radial periphery of the face 25 to the annular groove 30, and are further defined by the groove face 35 (see FIG. 3), which is normal to the axis 18, and a tapered face 36 extending from the inner end of the groove face 35 to merge into the wavy surface 28 at the outer periphery of the annular groove 30. This maintains the integrity of this annular groove, to maintain the correctness of the spring calibration on the amount of tensile stress required to deform the spring section 29.

It is preferable to provide the gauge groove with relatively well-defined shoulders which result in a well-defined gauge opening that is easily located visually. Further, with such structure, abutment or seating surfaces are located immediately adjacent to the gauge opening to accurately establish its height.

It is, however, within the broader aspects of this invention to provide a gauging surface which is not defined by abrupt shoulders or sides, and merely constitutes a part of the waveform of the flange. In such instances, the amplitude of the wave is selected so that the gauge surface 33 is spaced a predetermined minimum distance from the associated workpiece 22 when the annular bottom or seating surface 20 is seated against the workpiece.

A narrow band peripheral bearing surface 39 is provided on the radially outer portion of the flange first face 25. This peripheral surface is perpendicular to the axis 18 as the surface follows the elevation of the wavy surface 28. In other words, this narrow band peripheral bearing surface is a surface which is perpendicular to the axis 18 along each radius to the axis 18 around the peripheral extent of this peripheral bearing surface 39. The wavy surface 28 further includes an abutment surface 40, which is a curved surface as shown in FIGS. 2 and 3. In FIG. 2, the crest areas 26 are shown stippled to illustrate the relatively small areas of the wavy surface 28 which initially touch the cooperable surface such as the work surface 21, before the threaded fasteners are tightened.

Figure 6:
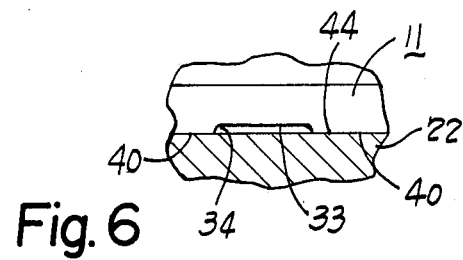
FIG. 6 is a sectional view on line 6—6 of FIG. 5.

FIGS. 4, 5, and 6 illustrate the flange 11 as being incorporated in the head of a bolt 13. The flange is shown as adapted to be cooperable with a surface 44, shown as a work surface 44 on the workpiece 22. Where applicable, the same reference numerals have been utilized in FIGS. 4 to 6 as in FIGS. 1-3. FIG. 4 shows the bolt 13 in the initially installed but untightened condition and FIG. 5 shows the bolt 13 tightened on the nut 45.

OPERATION

The load indicating flange 11 operates in the same manner, whether it is a separate part cooperating with the head of a bolt or is unitary with the nut or bolt, as shown in FIGS. 1 and 4, respectively. The load indicating flange 11 will be described in connection with FIGS. 4, 5, and 6, since these figures show the cooperable surface, such as the work surface 44, of a workpiece 22, which work surface 44 is normal to the axis 18.

In FIGS. 4 and 5, the load indicating flange is shown as being integral with the bolt 13, which is a threaded fastener cooperable with a complementary threaded fastener, namely, the nut 45. When the bolt 13 is first placed in the aperture 46 of the workpiece 22, it will be the three crests 26 which engage the work surface 44. As shown in FIG. 2, these crests provide relatively small areas or portions of contact on the narrow band peripheral bearing surface 39. In FIG. 2, these are stippled to indicate the small surface area of contact. As the bolt 13 or the nut 45 is tightened, this resiliently deforms the spring section 29, flattening the wavy surface 28 of the flange 11. This moves the troughs 27 toward the cooperable surface 44.

When the bolt and nut have been properly tightened onto the workpiece 22, the flat annular bottom seating surface 20 will be pulled into contact with the work surface 44. This is not visible from the exterior of the bolt or nut, so that it is not a good indication of the tightness of the bolt and nut. However, at the same time that the bottom surface 20 engages the work surface 44, the abutment or seating surface 40 included in the troughs 27 will be pulled into engagement with the work surface 44. The abutment surface 40 was previously a curved surface but, a shown in FIG. 5, has been deformed to lie in a plane normal to the axis 18 and to engage the work surface 44.

The gauge grooves 33 are now usable to gauge the tightness of the threaded fasteners 13 and 45. As an example, the gauge groove 33 may have a depth parallel to axis 18 of 0.010 inches. A gauge of that thickness, or perhaps slightly thicker at 0.0105 inches may be used to gauge the tightness of the fasteners. If it enters the gauge groove 33 the fasteners are not sufficiently tightened, and if it does not enter the groove, they are sufficiently tightened. If the threaded fasteners are tightened properly, the abutment surface 40 will be pulled flat into engagement with the work surface 44, as illustrated in FIG. 6. In such case, an attempt may be made to insert a long, thin gauge into the gauge groove 33 between it and the work surface 44, but the gauge will be precluded from entering the groove 33. If, however, the threaded fasteners 13 and 45 have not been tightened sufficiently, there will be a clearance of about 0.001 inch between the surfaces 40 and 44, and such a gauge will then be capable of entering the gauge groove 33. This small spacing of 0.001 inch between the surfaces 40 and 44 (see FIG. 6) was the reason that the prior art load indicating flanges were so difficult to detect if they were not at proper tightness. An inspector had to look carefully at the flange to determine where the crests and troughs had previously been and use a feeler gauge all the way around the flange in an attempt to locate the troughs. Additionally, since the inspector was trying to gauge a space which was only about 0.001 inch thickn, he had to use a gauge of about that thickness, and such gauges were much too thin and fragile to be practical.

The present invention provides a readily visible place to apply the gauge, and since the abutment surfaces 40 are on each side of the gauge groove 33 and immediately adjacent thereto, this is a definite stop abutment for the flange 11 whether the fastener is tightened with a manually applied wrench or power-operated torque wrench. The gauge groove 33 is relatively narrow in peripheral extent, so that when the abutment surfaces 40 on both sides thereof engage the work surface 44, the gauge groove face 35 is positively supported and there is no tendency for this gauge groove face 35 to crush toward the work surface 44.

An additional feature of the invention is the provision of the narrow band peripheral bearing surface 39. When the load indicating flange 11 is on the bolt 13, as shown in FIGS. 4 and 5, the workman is supposed to tighten the nut 45 rather than the bolt 13. However, the manufacturer of the bolts 13 has no real control over the workmen in the field, and such workmen will often tighten the bolt 13 rather than the nut 45. Also it may be true that only one set of wrench pads is readily accessible to the power-operated torque wrench, and this may be the bolt head, even though this bolt is the one that has the load indicating flange 11. In the event that the bolt 13 is rotated, the narrow band peripheral bearing surface 39 is initially flat against the work surface 44, as shown by the stippled areas in FIG. 2. Thus, there is no sharp annular edge on the flange, as in many prior art devices, which would tend to dig into the work surface 44 and make an annular groove and ridge. In the prior art constructions, it was discovered that quite frequently this annular groove and ridge was greater than 0.001 inch, and hence could destroy the accuracy of gauging whether the fastener was properly tightened. With the use of this narrow band peripheral bearing surface, any scarring of the work surface 44 is kept to a minimum. The transition between the narrow band peripheral bearing surface 39 and the curved abutment surface 40 is not a sharp corner, but is rather at a small radius, e.g., 1/32 inch, which again minimizes any scarring of the work surface 44 even though the flange is resiliently deformed as shown in FIG. 5.

In the preferred embodiments, the gauge grooves are provided near the depth of the troughs 27 and, as shown, are directly at the depths of such troughs. The flange 11 is of substantially uniform thickness, so that the phase of the wave on the first face 25 is essentially in phase with the wave on the opposite face 24. As perhaps best shown in FIG. 2, the narrow band peripheral bearing surface 39 is circumferentially interrupted by the gauge grooves 33, and hence this peripheral bearing surface extends from one gauge groove across a crest to the next adjacent gauge groove. When the abutment surface 40 is tightened onto the work surface 44, the abutment surface, which was formerly a curved surface, is deformed into a bearing surface substantially normal to the axis 18. In so doing, it is established in positive face-to-face engagement with the work surface to establish the gauge groove 33 at a definite distance from the work surface 44 for gauging.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A load indicating annular flange for cooperation with first and second interengaging fasteners, such flange providing a seating surface and resilient portions, said resilient portions operating to engage an associated workpiece before said seating surfaces engage such workpiece, and when said fasteners are tightened to cause engagement of said seating surface with such workpiece, said resilient portions applying a predetermined force to such a workpiece, said flange also providing a peripheral gauging surface, said gauging surface moving to a predetermined minimum spacing from such workpiece when said seating surface is seated thereagainst and being spaced from such workpiece by a distance greater than said predetermined minimum spacing when said seating surface is not seated, whereby a gauge having a thickness slightly greater than said predetermined minimum spacing can be inserted between said gauging surface and said workpiece until such seating surface is seated thereagainst, said predetermined minimum spacing being sufficiently great to render a gauge therefor thick enough to be durable, said gauging surface having a width greater than the thickness dimension parallel to the axis of the fasteners to render a gauge wide enough to be durable.

2. A load indicating annular flange as set forth in claim 1, wherein said flange provides peripheral seating surfaces adjacent to said gauging surface, said gauging surface and said peripheral seating surfaces being joined by radially extending shoulders.

3. A load indicating annular flange as set forth in claim 2, wherein said fasteners are threaded fasteners.

4. A load indicating annular flange as set forth in claim 1, wherein said predetermined minimum spacing is at least 0.005 inch to 0.030 inch.

5. A load indicating annular flange for cooperation with a first threaded fastener interengageable with a second threaded fastener, said flange having a first axially directed face relative to the axis of the first threaded fastener, said first face having crest means adapted to engage and transmit an axial load force to a cooperable surface upon the fasteners being tightened onto a workpiece, the flange having at least one trough portion in said first face and having portions resiliently deformable to have the trough portion movable toward the cooperable surface upon tightening of the two threaded fasteners onto a workpiece, characterized in that at least one gauge groove is provided in said flange in said trough portion, said gauge groove having a width dimension greater than the thickness dimension parallel to said axis and with the thickness dimension being in the order of 0.005 to 0.030 inch to preclude entrance thereinto of a gauge of a predetermined thickness when the threaded fasteners have been properly tightened on the workpiece and to permit entrance of the gauge when the threaded fasteners have been insufficiently tightened on the workpiece.

6. A load indicating flange as set forth in claim 5, including a plurality of crests in said crest means and a plurality of troughs in said first face.

7. A load indicating flange as set forth in claim 6, including a gauge groove disposed at each of said troughs.

8. A load indicating flange as set forth in claim 5, wherein said one trough portion includes an abutment surface and a shoulder between said gauge groove and said abutment surface.

9. A load indicating flange as set forth in claim 8, wherein said shoulder is at least at 45° angle shoulder.

10. A load indicating flange as set forth in claim 8, wherein said abutment surface is a curved surface adapted to be deformed into a bearing surface substantially normal to said axis upon tightening of the threaded fasteners on the workpiece.

11. A load indicating flange as set forth in claim 10, wherein said bearing surface is adapted to make positive face-to-face engagement with a work surface of the workpiece to have said gauge groove at a definite distance from the work surface for gauging.

12. A load indicating flange as set forth in claim 8, wherein said gauge groove is positioned at said one trough portion, and two abutment surfaces are provided, one on each side of said gauge groove with said two abutment surfaces adapted to be deformed into positive face-to-face engagement with a work surface of the workpiece upon said threaded fasteners being properly tightened on the workpiece.

13. A load indicating flange as set forth in claim 5, including a narrow band peripheral bearing surface on the radially outer portion of said flange first face, said peripheral bearing surface including said crest means and being a surface perpendicular to said axis along all radii to said axis around the periphery of said flange.

14. A load indicating flange as set forth in claim 13, wherein said peripheral bearing surface is circumferentially interrupted by said at least one gauge groove.

15. A load indicating annular flange for cooperation with a first fastener interengageable with a second fastener, said flange having a first axially directed face relative to the axis of the first fastener, said first face having crest means adapted to engage and transmit an axial load force to a cooperable surface upon the fasteners being tightened onto a workpiece, the flange having at least one trough portion in said first face and having portions resiliently deformable to have the trough portion movable toward the cooperable surface upon tightening of the two threaded fasteners onto a workpiece, characterized in that a narrow band peripheral bearing surface is provided on the radially outer portion of said flange first face, said peripheral bearing surface including said crest means and being a surface in all peripheral parts thereof substantially perpendicular to said axis along each radii to said axis, a gauge groove in said flange first face in said trough portion, said gauge groove being generally radial and having a width exceeding the thickness thereof parallel to said axis and adapted to receive a gauge to determine the tightness of the threaded fasteners.

16. A load indicating annular flange as set forth in claim 15, wherein said peripheral bearing surface extends from said crest means toward said trough portion.

17. A load indicating annular flange as set forth in claim 15, including a plurality of crests in said crest means and a plurality of troughs in said flange first face, and said peripheral bearing surface extends into a majority of the peripheral extent of said troughs.

18. A load indicating annular flange as set forth in claim 15, wherein said first face of said flange is a wavy surface to establish a plurality of crests as said crest means and establish a plurality of troughs therebetween.

19. A load indicating annular flange as set forth in claim 18, including a gauge groove in said flange at each of said plurality of troughs, said gauge grooves having a thickness in the axial direction of 0.005 to 0.030 inch to preclude entrance thereinto upon proper tightening of the threaded fasteners.

20. A load indicating annular flange as set forth in claim 18, including a small radius curve between said wavy surface and said peripheral bearing surface.

21. A load indicating annular flange as set forth in claim 19, wherein said narrow band peripheral bearing surface is continuous around the periphery of said flange first face except at said plurality of troughs.

* * * * *